US007266201B1

(12) United States Patent
Lin (10) Patent No.: US 7,266,201 B1
(45) Date of Patent: Sep. 4, 2007

(54) NON-DISRUPTIVE AUTHENTICATION ADMINISTRATION

(75) Inventor: Felix Changmin Lin, San Jose, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 830 days.

(21) Appl. No.: 10/246,009

(22) Filed: Sep. 17, 2002

(51) Int. Cl.
*H04L 9/08* (2006.01)
*H04L 9/00* (2006.01)

(52) U.S. Cl. .................. 380/278; 380/277; 380/283; 713/171; 726/4; 726/21

(58) Field of Classification Search .................. 726/3
See application file for complete search history.

(56) References Cited

U.S. PATENT DOCUMENTS

| | | | |
|---|---|---|---|
| 6,295,361 B1 * | 9/2001 | Kadansky et al. | 380/278 |
| 6,950,522 B1 * | 9/2005 | Mitchell et al. | 380/280 |
| 2005/0108576 A1 * | 5/2005 | Munshi | 713/201 |

OTHER PUBLICATIONS

"Foundry Switch and Router Installation and Configuration Guide", *Foundry Networks*, Chapter 17, pp. 17-1-17-50, Sep. 2000.
"OSPF Design Guide", *Cisco—OSPF Design Guide—Section I*, pp. 1-17, Sep. 2002, http://www.cisco.com/warp/public/104/2.html.

* cited by examiner

*Primary Examiner*—Syed A. Zia
*Assistant Examiner*—Saoussen Besrour
(74) *Attorney, Agent, or Firm*—Thelen Reid Brown Raysman & Steiner LLP; David B. Ritchie (57) ABSTRACT

A configurable timer may be used for seamless authentication administration. A network administrator may set the timer value. Then the network administrator may begin to update the authentication configuration or key and the timer may begin to count down. While the timer counts down, the network device may still send outgoing packets using the old authentication configuration or key and may begin to authenticate incoming packets using both the old authentication configuration or key and the new authentication configuration or key. Once it expires, the network device may begin to send outgoing packets using just the new authentication configuration or key. The counter may then be reset and counted down again. Once the counter expires a second time, the new authentication configuration or key may be used for both incoming and outgoing packets. Two-timer implementations are also possible.

31 Claims, 7 Drawing Sheets

NON-DISRUPTIVE AUTHENTICATION ADMINISTRATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to the field of network authentication administration. More particularly, the present invention relates to a non-disruptive solution for authentication administration.

BACKGROUND OF THE INVENTION

The concept of authorization in a computer network involves the verification of the identity of a user. This is mainly used as a security feature to ensure that unauthorized access does not occur. There are many different types of authentication available, and the choice of authentication type can be based on many factors, not the least of which is the protocol used in transmitting packets throughout the network. Additionally, each authentication type can have many different styles available. For example, the Open Shortest Path First (OSPF) Internet routing protocol provides for three possible authentication styles: no authentication, simple password authentication, and Message Digest (MD5) authentication. Thus it is sometimes necessary for a network administrator to change the authentication configuration style of the network. Additionally, certain authentication styles, such as MD5, provide for a key to be used cryptographically. Thus, it is sometimes necessary for the network administrator to change the key while remaining within the same style of authentication.

A problem, however, is encountered when altering configuration styles and keys. A network is not a single entity, it is in fact composed of many different devices all communicating to each other. Typically, therefore, a network administrator will need to update many routers throughout the network whenever a common change is required. However, updating many devices can take time, and during that time the system may not run properly and/or unauthorized users may gain access, because some devices may contain the new configuration or key information while others still only have the old configuration or key information. Thus, what is needed is a solution that allows for the seamless updating of configuration or key information.

One solution that has been attempted in the past is to keep a set of timers, one configurable, and one not. This approach was limited to changing key information in the MD5 style and did not apply to style/general configuration changes. In it, a key activation timer, configured by the administrator, was started upon an MD5 key change. The old key was used for transmitting packets before this timer began counting down, and the old key was used for authenticating received packets as well. After the timer activated, the old key was still used for transmitting packets and both the new and the old key were used to authenticate incoming packets.

When the key activation timer lapsed, an old key deactivation timer was started. This old key deactivation timer was not configurable. While the old-key deactivation timer counted down, the new key was used to send packets, and both old and new keys were used to authenticate incoming packets. After the timer ran out, the new key was used to send out packets, and the new key was used to authenticate incoming packets.

This approach had several problems, however. First, the behavior of the authentication state transitions was not consistent. Thus, none-to-simple transitions happened immediately, but MD5 key changes waited for the activation timer. This caused some confusion as to when exactly a new configuration style would be activated. Additionally, the old key deactivation timer would sometimes have a delay that was too long or too short for the network in which it was operating. For example, in a smaller network, changes are iterated through the routers much faster, and the fixed time could be too long, causing unnecessary delay in fully implementing the new key. Additionally, in a very large network, the fixed time could be too slow, causing reliability issues.

What is needed is a solution that does not suffer the drawbacks of the prior art.

BRIEF DESCRIPTION OF THE INVENTION

A configurable timer may be used for seamless authentication administration. A network administrator may set the timer value. Then the network administrator may begin to update the authentication configuration or key and the timer may begin to count down. While the timer counts down, the network device may still send outgoing packets using the old authentication configuration or key and may begin to authenticate incoming packets using both the old authentication configuration or key and the new authentication configuration or key. Once it expires, the network device may begin to send outgoing packets using just the new authentication configuration or key. The counter may then be reset and counted down again. Once the counter expires a second time, the new authentication configuration or key may be used for both incoming and outgoing packets. Two-timer implementations are also possible.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention utilizes a configurable timer or timers to allow for seamless authentication administration. The timers are applied not only to key changes but to configuration style and/or other configuration changes as well.

In a specific embodiment of the present invention, a single timer is utilized. However, in other embodiments, two timers may be used. The present application will discuss an implementation using a single timer but the claims should be interpreted to allow for multiple timers where applicable.

Figure 1:
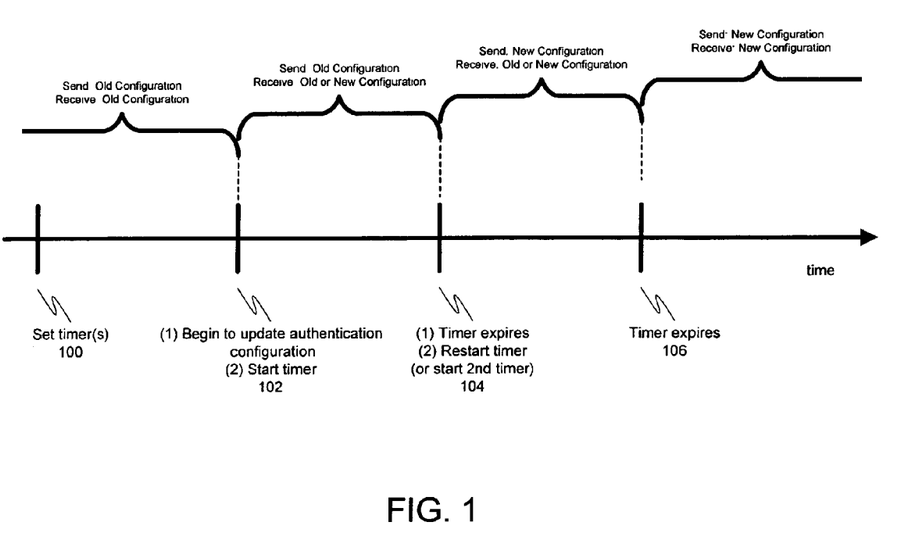
FIG. 1 is a diagram illustrating an example time line for an execution using a specific embodiment of the present invention.

FIG. 1 is a diagram illustrating an example time line for an execution using a specific embodiment of the present invention. At time 100, the timer value may be set throughout the network. In an implementation with multiple timers, both timer values may be set at this time. The timer value may be whatever the network administrator chooses, but it should be chosen such that it represents enough time for a change to take effect throughout the network (i.e., the time it takes for the change to get to every router in the network, added to the time it takes for a router to implement the change). At 102, the network administrator may begin updating the authentication configuration. At this time, the timer may start counting down as well. The time period between 100 and 102 may be whatever the network administrator chooses, but given that the time it takes to implement the setting of the timer value throughout the network is roughly equivalent to the amount of time it take implement a change in configuration, it is believed that in many cases the time period between 100 and 102 will be similar to the timer value.

Before 102, authentication may continue to be fully implemented using the old configuration. Namely, outgoing packets are sent with the old configuration and incoming packets are authenticated with the old configuration. After 102, however, the system may partially implement the new configuration. Specifically, outgoing packets may continue being sent with the old configuration, while incoming packets may be authenticated using both the old and new configurations (if either configuration leads to successful authentication, then authentication is deemed successful).

At 104, the timer has run out. Therefore, the time period between 102 and 104 is equal to the timer value. Once the timer has run out, the new configuration may be used for all outgoing packets. Therefore, after 104, for outgoing packets, the new configuration may be used, whereas for incoming packets, both the old and the new configurations may continue to be used. Also at 104, the timer value may be reset. Thus, in effect, the timer counts down twice: once between 102 and 104, and once between 104 and 106, the time at which the timer once again expires. However, in some implementations this timer may in fact be two distinct timers.

After 106, then the new configuration may be fully implemented, and the new configuration may be used for both incoming and outgoing packets.

Figure 2:
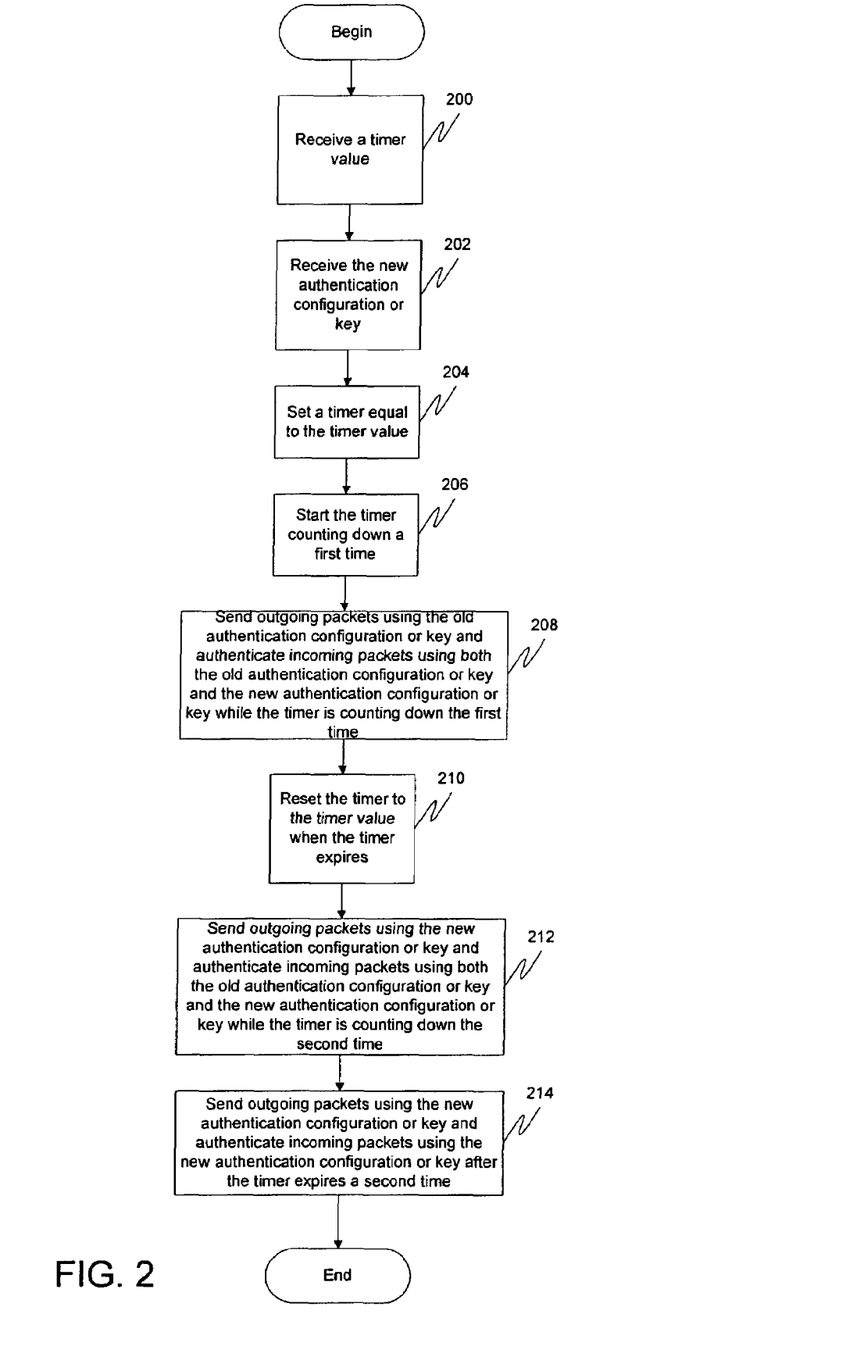
FIG. 2 is a flow diagram illustrating a method for implementing a new authentication configuration or key in a network device having an old authentication configuration or key in accordance with a specific embodiment of the present invention.

FIG. 2 is a flow diagram illustrating a method for implementing a new authentication configuration or key in a network device having an old authentication configuration or key in accordance with a specific embodiment of the present invention. At 200, a timer value may received. This would likely have been sent by a network administrator and should be set such that it represents an amount of time greater than or equal to a predicted amount of time necessary to update all network devices in a network containing the network device with the new authentication configuration or key. At 202, the new authentication configuration or key may be received. At 204, a timer may be set to be equal to the timer value. At 206, the timer may start to be counted down a first time. At 208, while the timer is counting down the first time, outgoing packets may be sent using the old authentication configuration or key and incoming packets may be authenticated using both the old authentication configuration or key and the new authentication configuration or key. Authenticating packets using both the old authentication configuration or key and the new authentication configuration or key may involve, for each packet, authenticating the packet using the old authentication configuration or key, authenticating the packet using the new authentication configuration or key, and then accepting the packet as authenticated if either the authenticating under the old authentication configuration or key or the authenticating under the new authentication configuration is successful.

At 210, when the timer expires a first time, the timer may be reset to the timer value. At 212, while the timer is counting down the second time, outgoing packets may be sent using the new authentication configuration or key and incoming packets may be authenticated using both the old authentication configuration or key and the new authentication configuration or key. At 214, after the timer expires a second time, outgoing packets may be sent using the new authentication configuration or key and incoming packets may be authenticated using the new authentication configuration or key.

Figure 3:
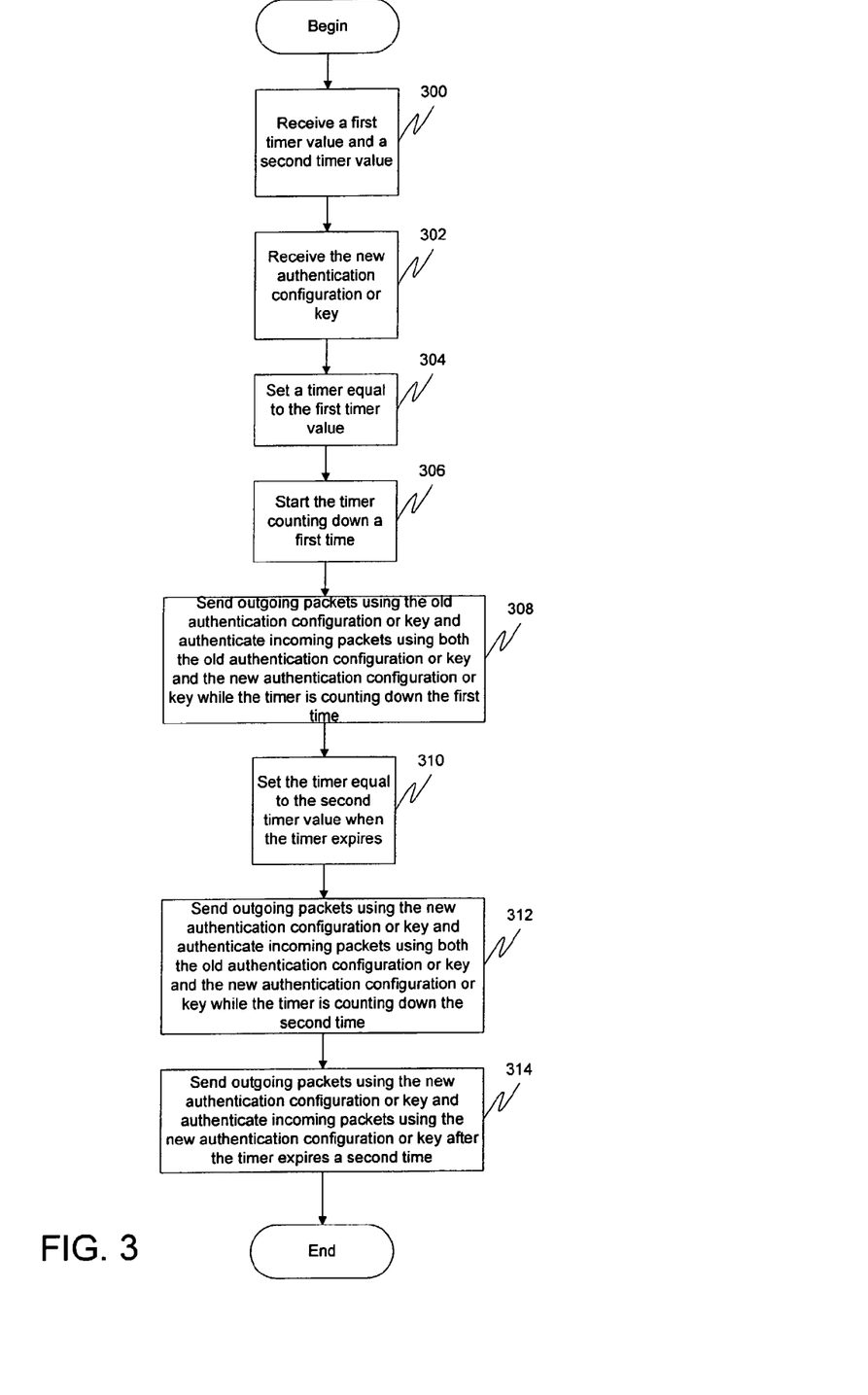
FIG. 3 is a flow diagram illustrating a method for implementing a new authentication configuration or key in a network device having an old authentication configuration or key in accordance with another specific embodiment of the present invention.

FIG. 3 is a flow diagram illustrating a method for implementing a new authentication configuration or key in a network device having an old authentication configuration or key in accordance with another specific embodiment of the present invention. At 300, a first timer value and a second timer value may received. These would likely have been sent by a network administrator and the first timer value should be set such that the first timer represents an amount of time greater than or equal to a predicted amount of time necessary to update all network devices in a network containing the network device with the new authentication configuration or key. In order to prevent the possibility of authentication problems, the second timer value should be set to be equal to or greater than the first timer value and it should represent an amount of time greater than or equal to a predicted amount of time necessary for all network devices in a network to switch to the new authentication configuration or key for sending outgoing packets. At 302, the new authentication configuration or key may be received. At 304, a timer may be set to be equal to the first timer value. At 306, the timer may start to be counted down a first time. At 308, while the timer is counting down the first time, outgoing packets may be sent using the old authentication configuration or key and incoming packets may be authenticated using both the old authentication configuration or key and the new authentication configuration or key. Authenticating packets using both the old authentication configuration or key and the new authentication configuration or key may involve, for each packet, authenticating the packet using the old authentication configuration or key, authenticating the packet using the new authentication configuration or key, and then accepting the packet as authenticated if either the authenticating under the old authentication configuration or key or the authenticating under the new authentication configuration is successful.

At 310, when the timer expires a first time, the timer may be set to the second timer value. At 312, while the timer is counting down the second time, outgoing packets may be sent using the new authentication configuration or key and incoming packets may be authenticated using both the old authentication configuration or key and the new authentication configuration or key. At 314, after the timer expires a second time, outgoing packets may be sent using the new authentication configuration or key and incoming packets may be authenticated using the new authentication configuration or key.

Figure 4:
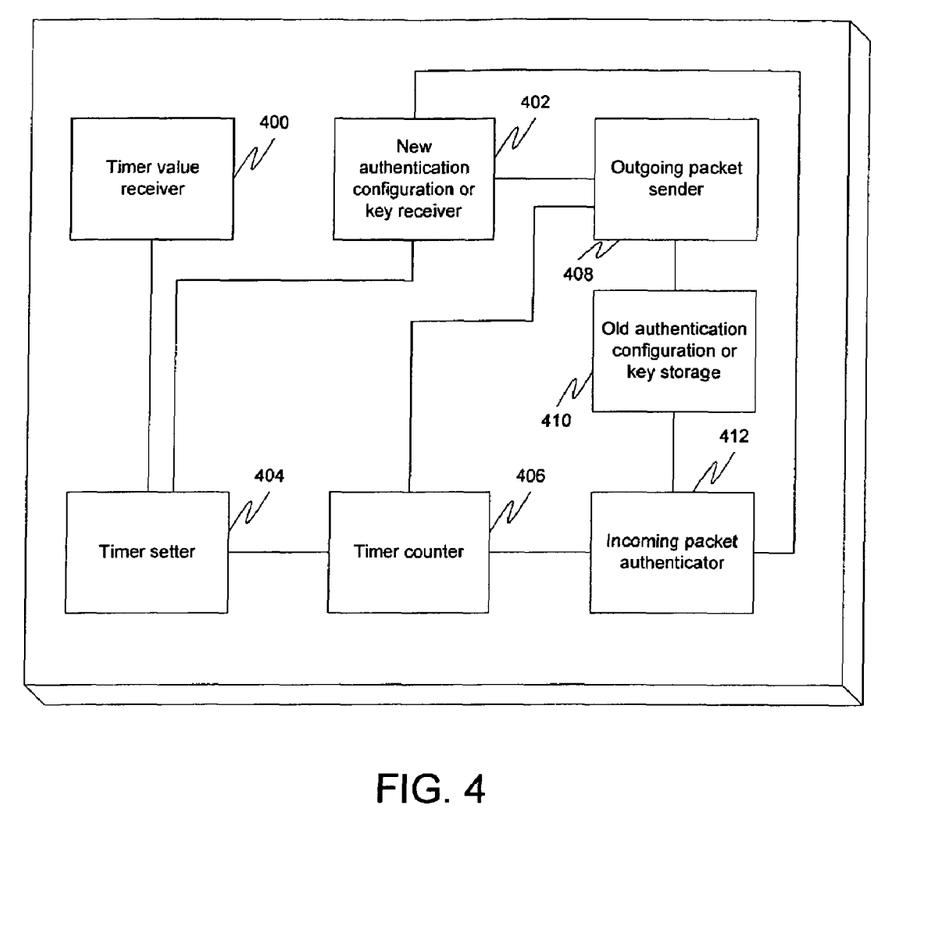
FIG. 4 is a block diagram illustrating an apparatus for implementing a new authentication configuration or key in a network device having an old authentication configuration or key in accordance with a specific embodiment of the present invention.

FIG. 4 is a block diagram illustrating an apparatus for implementing a new authentication configuration or key in a network device having an old authentication configuration or key in accordance with a specific embodiment of the present invention. A timer value receiver 400 may receive a timer value. This would likely have been sent by a network administrator and should be set such that it represents an amount of time greater than or equal to a predicted amount of time necessary to update all network devices in a network containing the network device with the new authentication configuration or key. A new authentication configuration or key receiver 402 may receive the new authentication configuration or key. A timer setter 404 coupled to the timer value receiver 400 and to the new authentication configuration or key receiver 402 may set a timer to be equal to the timer value. A timer counter 406 coupled to the timer setter 404 may start the timer counting down a first time. An outgoing packet sender 408 coupled to the timer counter 406, the new authentication configuration or key receiver 402, and to an old configuration or key storage 410 may send outgoing packets using the old authentication configuration or key while the timer is counting down the first time. An incoming packet authenticator 412 coupled to the timer counter 406, the new authentication configuration or key receiver 402, and to the old configuration or key storage 410 may authenticate incoming packets using both the old authentication configuration or key and the new authentication configuration or key while the timer is counting down the first time. Authenticating packets using both the old authentication configuration or key and the new authentication configuration or key may involve, for each packet, authenticating the packet using the old authentication configuration or key, authenticating the packet using the new authentication configuration or key, and then accepting the packet as authenticated if either the authenticating under the old authentication configuration or key or the authenticating under the new authentication configuration or key is successful.

When the timer expires a first time, the timer setter 404 may reset the timer to the timer value. Then the outgoing packet sender 408 may send outgoing packets using the new authentication configuration or key and the incoming packet authenticator 412 may authenticate incoming packets using both the old authentication configuration or key and the new authentication configuration or key while the timer is counting down the second time.

The outgoing packet sender 408 may send outgoing packets using the new authentication configuration or key and the incoming packet authenticator 412 may authenticate incoming packets using the new authentication configuration or key while the timer after the timer expires the second time.

Figure 5:
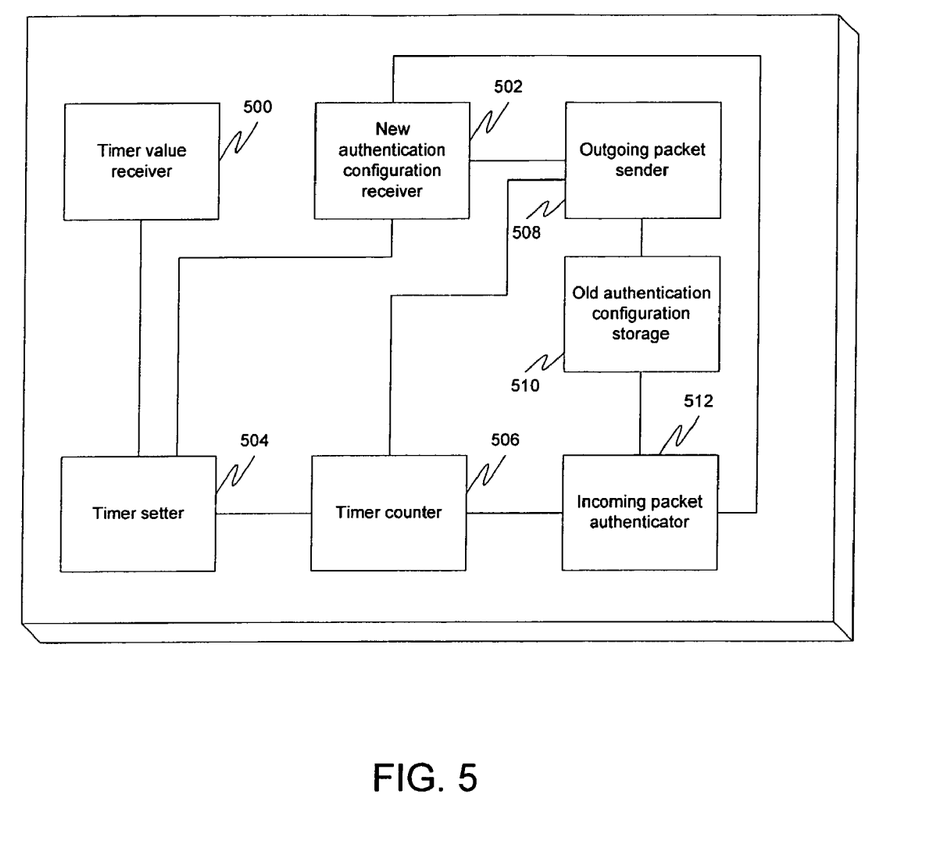
FIG. 5 is a block diagram illustrating an apparatus for implementing a new authentication configuration in a network device having an old authentication configuration in accordance with a specific embodiment of the present invention.

FIG. 5 is a block diagram illustrating an apparatus for implementing a new authentication configuration in a network device having an old authentication configuration in accordance with a specific embodiment of the present invention. A timer value receiver 500 may receive a timer value. This would likely have been sent by a network administrator and should be set such that it represents an amount of time greater than or equal to a predicted amount of time necessary to update all network devices in a network containing the network device with the new authentication configuration. A new authentication configuration receiver 502 may receive the new authentication configuration. A timer setter 504 coupled to the timer value receiver 500 and to the new authentication configuration receiver 502 may set a timer to be equal to the timer value. A timer counter 506 coupled to the timer setter 504 may start the timer counting down a first time. An outgoing packet sender 508 coupled to the timer counter 506, the new authentication configuration receiver 502, and to an old authentication configuration storage 510 may send outgoing packets using the old authentication configuration while the timer is counting down the first time. An incoming packet authenticator 512 coupled to the timer counter 506, the new authentication configuration receiver 502, and to the old authentication configuration storage 510 may authenticate incoming packets using both the old authentication configuration and the new authentication configuration while the timer is counting down the first time. Authenticating packets using both the old authentication configuration and the new authentication configuration may involve, for each packet, authenticating the packet using the old authentication configuration, authenticating the packet using the new authentication configuration, and then accepting the packet as authenticated if either the authenticating under the old authentication configuration or the authenticating under the new authentication configuration is successful.

When the timer expires a first time, the timer setter 504 may reset the timer to the timer value. Then the outgoing packet sender 508 may send outgoing packets using the new authentication configuration and the incoming packet authenticator 512 may authenticate incoming packets using both the old authentication configuration and the new authentication configuration while the timer is counting down the second time. The outgoing packet sender 508 may send outgoing packets using the new authentication configuration and the incoming packet authenticator 512 may authenticate incoming packets using the new authentication configuration while the timer after the timer expires the second time.

Figure 6:
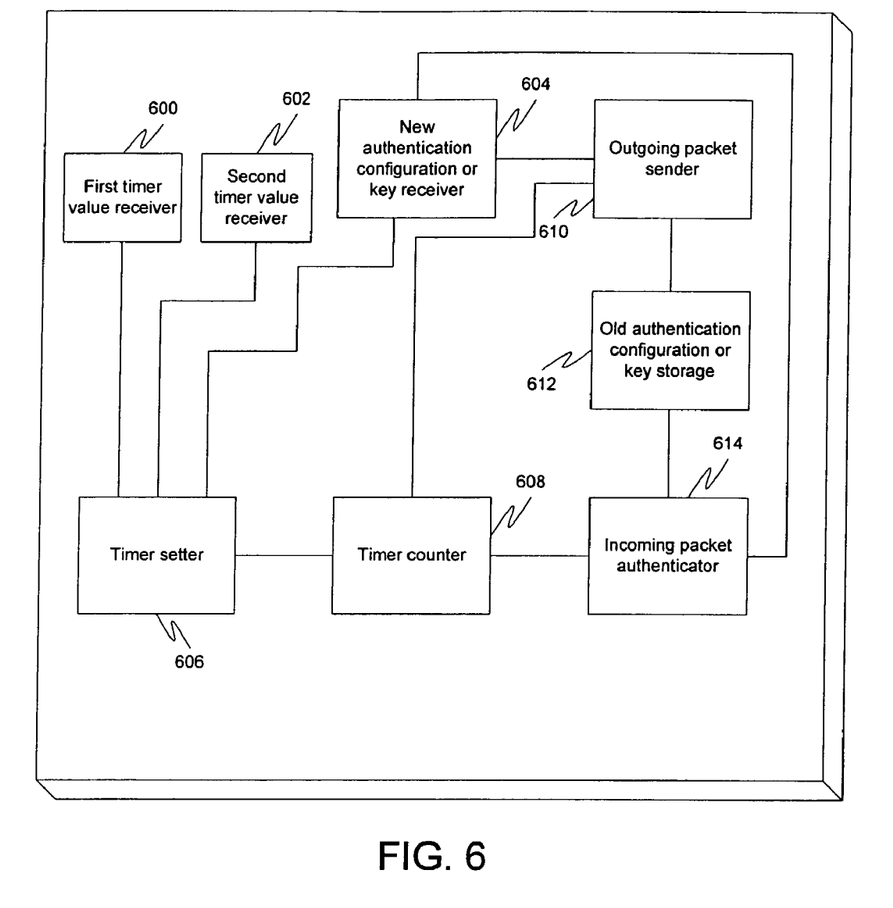
FIG. 6 is a block diagram illustrating an apparatus for implementing a new authentication configuration or key in a network device having an old authentication configuration or key in accordance with another specific embodiment of the present invention.

FIG. 6 is a block diagram illustrating an apparatus for implementing a new authentication configuration or key in a network device having an old authentication configuration or key in accordance with another specific embodiment of the present invention. A first timer value receiver 600 may receive a first timer value. A second timer value receiver 602 may receive a second timer value. These would likely have been sent by a network administrator and the first timer value should be set such that it represents an amount of time greater than or equal to a predicted amount of time necessary to update all network devices in a network containing the network device with the new authentication configuration or key. In order to prevent the possibility of authentication problems, the second timer value should be set to be equal to or greater than the first timer value and it should represent an amount of time greater than or equal to the predicted amount of time necessary to update all network devices in a network to switch to the new authentication configuration or key for sending outgoing packets. A new authentication configuration or key receiver 604 may receive the new authentication configuration or key. A timer setter 606 coupled to the first timer value receiver 600, the second timer value receiver 602, and to the new authentication configuration or key receiver 604 may set a timer to be equal to the first timer value. A timer counter 608 coupled to the timer setter 606 may start the timer counting down a first time. An outgoing packet sender 610 coupled to the timer counter 608, the new authentication configuration or key receiver 604, and to an old configuration authentication or key storage 612 may send outgoing packets using the old authentication configuration or key while the timer is counting down the first time. An incoming packet authenticator 614 coupled to the timer counter 608, the new authentication configuration or key receiver 604, and to the old configuration authentication or key storage 612 may authenticate incoming packets using both the old authentication configuration or key and the new authentication configuration or key while the timer is counting down the first time. Authenticating packets using both the old authentication configuration or key and the new authentication configuration or key may involve, for each packet, authenticating the packet using the old authentication configuration or key, authenticating the packet using the new authentication configuration or key, and then accepting the packet as authenticated if either the authenticating under the old authentication configuration or key or the authenticating under the new authentication configuration or key is successful.

When the timer expires a first time, the timer setter 606 may set the timer to the second timer value. Then the outgoing packet sender 610 may send outgoing packets using the new authentication configuration or key and the incoming packet authenticator 614 may authenticate incoming packets using both the old authentication configuration or key and the new authentication configuration or key while the timer is counting down the second time.

The outgoing packet sender 610 may send outgoing packets using the new authentication configuration or key and the incoming packet authenticator 614 may authenticate incoming packets using the new authentication configuration or key while the timer after the timer expires the second time.

Figure 7:
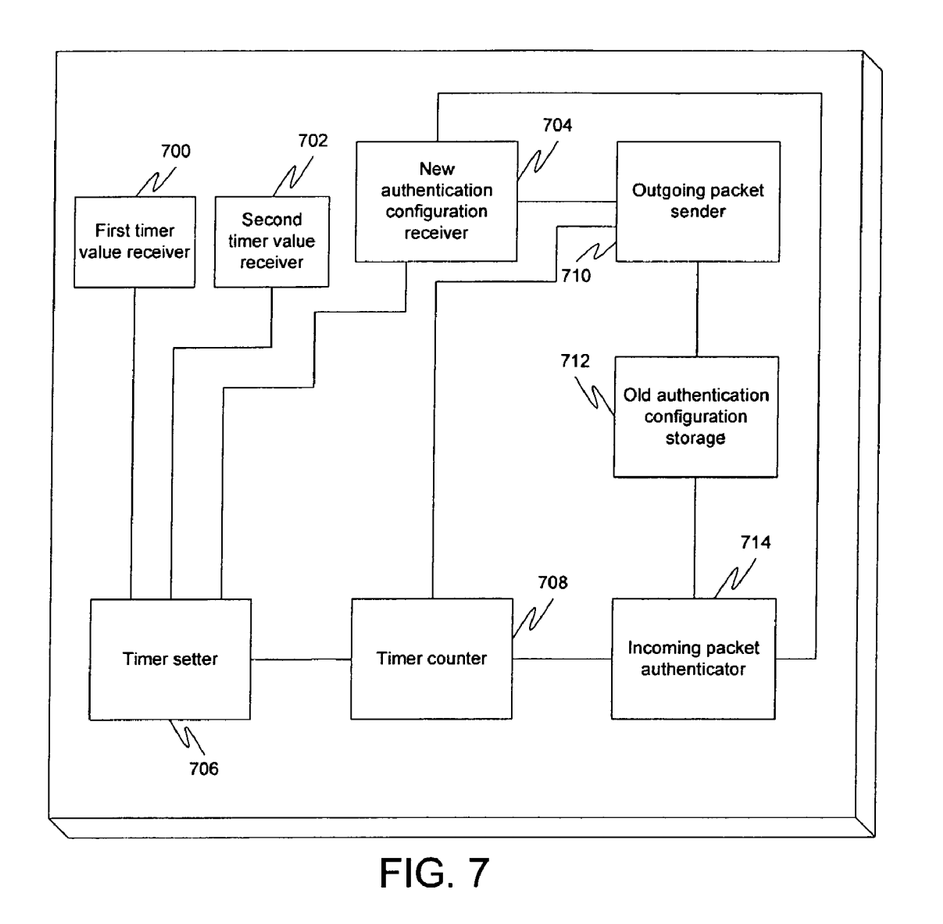
FIG. 7 is a block diagram illustrating an apparatus for implementing a new authentication configuration in a network device having an old authentication configuration in accordance with another specific embodiment of the present invention.

FIG. 7 is a block diagram illustrating an apparatus for implementing a new authentication configuration in a network device having an old authentication configuration in accordance with another specific embodiment of the present invention. A first timer value receiver 700 may receive a first timer value. A second timer value receiver 702 may receive a second timer value. These would likely have been sent by a network administrator and the first timer value should be set such that it represents an amount of time greater than or equal to a predicted amount of time necessary to update all network devices in a network containing the network device with the new authentication configuration. In order to prevent the possibility of authentication problems, the second timer value should be set to be equal to or greater than the first timer value and it should represent an amount of time greater than or equal to the predicted amount of time necessary to update all network devices in a network to switch to the new authentication configuration for sending outgoing packets. A new authentication configuration receiver 704 may receive the new authentication configuration. A timer setter 706 coupled to the first timer value receiver 700, the second timer value receiver 702, and to the new authentication configuration receiver 704 may set a timer to be equal to the first timer value. A timer counter 708 coupled to the timer setter 706 may start the timer counting down a first time. An outgoing packet sender 710 coupled to the timer counter 708, the new authentication configuration receiver 704, and to an old authentication configuration storage 712 may send outgoing packets using the old authentication configuration while the timer is counting down the first time. An incoming packet authenticator 714 coupled to the timer counter 708, the new authentication configuration receiver 704, and to the old authentication configuration storage 712 may authenticate incoming packets using both the old authentication configuration and the new authentication configuration while the timer is counting down the first time. Authenticating packets using both the old authentication configuration and the new authentication configuration may involve, for each packet, authenticating the packet using the old authentication configuration, authenticating the packet using the new authentication configuration, and then accepting the packet as authenticated if either the authenticating under the old authentication configuration or the authenticating under the new authentication configuration is successful.

When the timer expires a first time, the timer setter 706 may set the timer to the second timer value. Then the outgoing packet sender 710 may send outgoing packets using the new authentication configuration and the incoming packet authenticator 714 may authenticate incoming packets using both the old authentication configuration and the new authentication configuration while the timer is counting down the second time. The outgoing packet sender 710 may send outgoing packets using the new authentication configuration and the incoming packet authenticator 714 may authenticate incoming packets using the new authentication configuration while the timer after the timer expires the second time.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for implementing a new authentication configuration or key in a network device having an old authentication configuration or key, comprising:
   receiving a timer value;
   receiving the new authentication configuration or key;
   setting a timer equal to said timer value;
   starting to count down said timer a first time;
   after receiving said new authentication configuration or key, sending outgoing packets using said old authentication configuration or key and concurrently using both said old authentication configuration or key and said new authentication configuration or key to authenticate incoming packets while said timer is counting down said first time;
   resetting said timer to said timer value when said timer expires said first time;
   starting to count down said timer a second time;
   sending outgoing packets using said new authentication configuration or key and authenticating incoming packets using both said old authentication configuration or key and said new authentication configuration or key while said timer is counting down said second time; and
   sending outgoing packets using said new authentication configuration or key and authenticating incoming packets using said new authentication configuration or key after said timer expires said second time.

2. The method of claim 1, wherein said timer value represents an amount of time greater than or equal to a predicted amount of time necessary to update all network devices in a network containing the network device with said new authentication configuration or key.

3. The method of claim 1, wherein said authenticating incoming packets using both said old authentication configuration and said new authentication information comprises:
   for each incoming packet:
      authenticating said packet using the old authentication configuration or key;
      authenticating said packet using the new authentication configuration or key; and
      accepting said packet as authenticated if either said authenticating under the old authentication configuration or key or said authenticating under the new authentication configuration or key is successful.

4. A method for implementing a new authentication configuration in a network device having an old authentication configuration, comprising:
   receiving a timer value;
   receiving the new authentication configuration;
   setting a timer equal to said timer value;
   starting to count down said timer a first time;
   after receiving said new authentication configuration, sending outgoing packets using said old authentication configuration and concurrently using both said old authentication configuration and said new authentication configuration to authenticate incoming packets while said timer is counting down said first time;
   resetting said timer to said timer value when said timer expires said first time;
   starting to count down said timer a second time;
   sending outgoing packets using said new authentication configuration and authenticating incoming packets using both said old authentication configuration and said new authentication configuration while said timer is counting down said second time; and
   sending outgoing packets using said new authentication configuration and authenticating incoming packets using said new authentication configuration after said timer expires said second time.

5. The method of claim 4, wherein said timer value represents an amount of time greater than or equal to a predicted amount of time necessary to update all network devices in a network containing the network device with said new authentication configuration.

6. The method of claim 4, wherein said authenticating incoming packets using both said old authentication configuration and said new authentication information comprises:
   for each incoming packet:
      authenticating said packet using the old authentication configuration;
      authenticating said packet using the new authentication configuration; and
      accepting said packet as authenticated if either said authenticating under the old authentication configuration or said authenticating under the new authentication configuration is successful.

7. A method for implementing a new authentication configuration or key in a network device having an old authentication configuration or key, comprising:
   receiving a first timer value and a second timer value;
   receiving the new authentication configuration or key;
   setting a timer equal to said first timer value;
   starting to count down said timer a first time;
   after receiving said new authentication configuration or key, sending outgoing packets using said old authentication configuration or key and concurrently using both said old authentication configuration or key and said new authentication configuration or key to authenticate incoming packets while said timer is counting down said first time;
   setting said timer to said second timer value when said timer expires said first time;
   starting to count down said timer a second time;
   sending outgoing packets using said new authentication configuration or key and authenticating incoming packets using said old authentication configuration or key and said new authentication configuration or key while said timer is counting down said second time; and sending outgoing packets using said new authentication configuration or key and authenticating incoming packets using said new authentication configuration or key after said timer expires said second time.

8. The method of claim 7, wherein said first timer value represents an amount of time greater than or equal to a predicted amount of time necessary to update all network devices in a network containing the network device with new configuration information.

9. The method of claim 7, wherein said second timer value is greater than or equal to said first timer value.

10. The method of claim 9, wherein said second timer value represents an amount of time greater than or equal to a predicted amount of time necessary for all network devices in a network to switch to said new authentication configuration or key for sending outgoing packets.

11. The method of claim 7, wherein said authenticating incoming packets using both said old authentication configuration and said new authentication information comprises:

for each incoming packet:
   authenticating said packet using the old authentication configuration or key;
   authenticating said packet using the new authentication configuration or key; and
   accepting said packet as authenticated if either said authenticating under the old authentication configuration or key or said authenticating under the new authentication configuration or key is successful.

12. A method for implementing a new authentication configuration in a network device having an old authentication configuration, comprising:

receiving a first timer value and a second timer value;
receiving the new authentication configuration;
setting a timer equal to said first timer value;
starting to count down said timer a first time;
after receiving said new authentication configuration, sending outgoing packets using said old authentication configuration and concurrently using both said old authentication configuration and said new authentication configuration to authenticate incoming packets while said timer is counting down said first time;
setting said timer to said second timer value when said timer expires said first time;
starting to count down said timer a second time;
sending outgoing packets using said new authentication configuration and authenticating incoming packets using both said old authentication configuration and said new authentication configuration while said timer is counting down said second time; and
sending outgoing packets using said new authentication configuration and authenticating incoming packets using said new authentication configuration after said timer expires said second time.

13. The method of claim 12, wherein said first timer value represents an amount of time greater than or equal to a predicted amount of time necessary to update all network devices in a network containing the network device with new configuration information.

14. The method of claim 12, wherein said first timer value represents an amount of time greater than or equal to a predicted amount of time necessary to update all network devices in a network containing the network device with said new configuration information.

15. The method of claim 12, wherein said second timer value is greater than or equal to said first timer value.

16. The method of claim 15, wherein said second timer value represents an amount of time greater than or equal to a predicted amount of time necessary for all network devices in a network to switch to said new authentication configuration for sending outgoing packets.

17. The method of claim 12, wherein said authenticating incoming packets using both said old authentication configuration and said new authentication information comprises:

for each incoming packet:
   authenticating said packet using the old authentication configuration;
   authenticating said packet using the new authentication configuration; and
   accepting said packet as authenticated if either said authenticating under the old authentication configuration or said authenticating under the new authentication configuration is successful.

18. An apparatus for implementing a new authentication configuration or key in a network device having an old identification configuration or key, comprising:

a timer value receiver;
a new authentication configuration or key receiver;
a timer setter coupled to said timer value receiver;
a timer counter coupled to said timer setter;
an outgoing packet sender coupled to said timer counter and to said new authentication configuration or key receiver;
and an incoming packet authenticator coupled to said timer counter and to said new authentication configuration or key receiver, said new authentication configuration or key receiver configured to:
after receiving the new authentication configuration or key, send outgoing packets using said old authentication configuration or key;
concurrently use both said old authentication configuration or key and said new authentication configuration or key to authenticate incoming packets while said timer counter is counting down a timer value received by said timer value receiver;
reset said timer to said timer value when said timer expires said first time;
start to count down said timer a second time;
send outgoing packets using said new authentication configuration or key and authenticating incoming packets using both said old authentication configuration or key and said new authentication configuration or key while said timer is counting down said second time; and
send outgoing packets using said new authentication configuration or key and authenticating incoming packets using said new authentication configuration or key after said timer expires said second time.

19. An apparatus for implementing a new authentication configuration in a network device having an old identification configuration, comprising:

a timer value receiver;
a new authentication configuration receiver;
a timer setter coupled to said timer value receiver;
a timer counter coupled to said timer setter;
an outgoing packet sender coupled to said timer counter and to said new authentication configuration or key receiver; and
an incoming packet authenticator coupled to said timer counter and to said new authentication configuration or key receiver, said wherein after the new authentication configuration receiver configured to:

after receiving a new authentication configuration, send outgoing packets using said old authentication configuration;

concurrently use both said old authentication configuration and said new authentication configuration to authenticate incoming packets while said timer counter is counting down a timer value received by said timer value receiver;

reset said timer to said timer value when said timer expires said first time;

start to count down said timer a second time;

send outgoing packets using said new authentication configuration and authenticating incoming packets using both said old authentication configuration and said new authentication configuration while said timer is counting down a second time; and send outgoing packets using said new authentication configuration and authenticating incoming packets using said new authentication configuration after said timer expires said second time.

20. An apparatus for implementing a new authentication configuration or key in a network device having an old identification configuration or key, comprising:

a first timer value receiver;
a second timer value receiver;
a new authentication configuration or key receiver;
a timer setter coupled to said first timer value receiver and to said second timer value receiver;
a timer counter coupled to said timer setter;
an outgoing packet sender coupled to said timer counter and to said new authentication configuration or key receiver; and
an incoming packet authenticator coupled to said timer counter and to said new authentication configuration or key receiver, said new authentication configuration or key receiver configured to:

after receiving the new authentication configuration or key, send outgoing packets using said old authentication configuration or key;

concurrently use both said old authentication configuration or keg and said new authentication configuration or key to authenticate incoming packets while the timer counter is counting down a first timer value received by said first timer value receiver;

set said timer to said second timer value when said timer expires said first time;

start to count down said timer a second time;

send outgoing packets using said new authentication configuration or key and authenticating incoming packets using both said old authentication configuration or key and said new authentication configuration or key while said timer is counting down said second time; and send outgoing packets using said new authentication configuration or key and authenticating incoming packets using said new authentication configuration or key after said timer expires said second time.

21. An apparatus for implementing a new authentication configuration in a network device having an old identification configuration, comprising:

a first timer value receiver;
a second timer value receiver;
a new authentication configuration receiver;
a timer setter coupled to said first timer value receiver and to said second timer value receiver;
a timer counter coupled to said timer setter;
an outgoing packet sender coupled to said timer counter and to said new authentication configuration or key receiver; and
an incoming packet authenticator coupled to said timer counter and to said new authentication configuration receiver, said new authentication configuration receiver configured to:

after receiving the new authentication configuration, send outgoing packets using said old authentication configuration;

concurrently use both said old authentication configuration and said new authentication configuration to authenticate incoming packets while the timer counter is counting down a first timer value received by said first timer value receiver set said timer to said second timer value when said timer expires said first time;

start to count down said timer a second time;

send outgoing packets using said new authentication configuration and authenticating incoming packets using both said old authentication configuration and said new authentication configuration while said timer is counting down said second time; and send outgoing packets using said new authentication configuration and authenticating incoming packets using said new authentication configuration after said timer expires said second time.

22. An apparatus for implementing a new authentication configuration or key in a network device having an old authentication configuration or key, comprising:

means for receiving a timer value;
means for receiving the new authentication configuration or key;
means for setting a timer equal to said timer value;
means for counting down said timer a first time;
means for sending outgoing packets using said old authentication configuration or key and authenticating incoming packets using both said old authentication configuration or key and said new authentication configuration or key while said timer is counting down said first time;
means for resetting said timer to said timer value when said timer expires said first time;
means for starting to count down said timer a second time;
means for sending outgoing packets using said new authentication configuration or key and authenticating incoming packets using both said old authentication configuration or key and said new authentication configuration or key while said timer is counting down said second time; and
means for sending outgoing packets using said new authentication configuration or key and authenticating incoming packets using said new authentication configuration or key after said timer expires said second time wherein after the means for receiving the new authentication configuration or key receives the new authentication configuration or key, the means for sending outgoing packets using said new authentication configuration or key and authenticating incoming packets using both said old authentication configuration or keg and said new authentication configuration or key sends outgoing packets using said old authentication configuration or key and concurrently uses both said old authentication configuration or key and said new authentication configuration or key to authenticate incoming packets while said means for counting down a timer a first time counts down a timer value received by said means for receiving a timer value.

23. The apparatus of claim 22, wherein said timer value represents an amount of time greater than or equal to a predicted amount of time necessary to update all network devices in a network containing the network device with new authentication configuration or key.

24. The apparatus of claim 22, wherein said means for authenticating incoming packets using both said old authentication configuration and said new authentication information comprises:
for each incoming packet:
means for authenticating said packet using the old authentication configuration or key;
means for authenticating said packet using the new authentication configuration or key; and
means for accepting said packet as authenticated if either the authenticating under the old authentication configuration or key or said authenticating under the new authentication configuration or key is successful.

25. An apparatus for implementing a new authentication configuration in a network device having an old authentication configuration, comprising:
means for receiving a timer value;
means for receiving the new authentication configuration;
means for setting a timer equal to said timer value;
means for counting down said timer a first time;
means for sending outgoing packets using said old authentication configuration and authenticating incoming packets using both said old authentication configuration and said new authentication configuration while said timer is counting down said first time;
means for resetting said timer to said timer value when said timer expires said first time;
means for starting to count down said timer a second time;
means for sending outgoing packets using said new authentication configuration and authenticating incoming packets using both said old authentication configuration and said new authentication configuration while said timer is counting down said second time; and
means for sending outgoing packets using said new authentication configuration and authenticating incoming packets using said new authentication configuration after said timer expires said second time wherein after the means for receiving the new authentication configuration receives the new authentication configuration, the means for sending outgoing packets using said new authentication configuration and authenticating incoming packets using both said old authentication configuration or key and said new authentication configuration or key sends outgoing packets using said old authentication configuration and concurrently uses both said old authentication configuration and said new authentication configuration to authenticate incoming packets while said means for counting down a timer a first time counts down a timer value received by said means for receiving a timer value.

26. The apparatus of claim 25, wherein said timer value represents an amount of time greater than or equal to a predicted amount of time necessary to update all network devices in a network containing the network device with said new authentication configuration.

27. The apparatus of claim 25, wherein said means for authenticating incoming packets using both said old authentication configuration and said new authentication information comprises:
for each incoming packet:
means for authenticating said packet using the old authentication configuration;
means for authenticating said packet using the new authentication configuration; and
means for accepting said packet as authenticated if either said authenticating under the old authentication configuration or said authenticating under the new authentication configuration is successful.

28. A program storage device readable by a machine, tangibly embodying a program of instructions executable by the machine to perform a method for implementing a new authentication configuration or key in a network device having an old authentication configuration or key, the method comprising:
receiving a timer value;
receiving the new authentication configuration or key;
setting a timer equal to said timer value;
starting to count down said timer a first time;
after receiving said new authentication configuration or key, sending outgoing packets using said old authentication configuration or key and concurrently using both said old authentication configuration or key and said new authentication configuration or key to authenticate incoming packets while said timer is counting down said first time;
resetting said timer to said timer value when said timer expires said first time;
starting to count down said timer a second time;
sending outgoing packets using said new authentication configuration or key and
authenticating incoming packets using both said old authentication configuration or key and said new authentication configuration or key while said timer is counting down said second time; and
sending outgoing packets using said new authentication configuration or key and authenticating incoming packets using said new authentication configuration or key after said timer expires said second time.

29. A program storage device readable by a machine, tangibly embodying a program of instructions executable by the machine to perform a method for implementing a new authentication configuration in a network device having an old authentication configuration, the method comprising:
receiving a timer value;
receiving the new authentication configuration;
setting a timer equal to said timer value;
starting to count down said timer a first time;
after receiving said new authentication configuration, sending outgoing packets using said old authentication configuration and concurrently using both said old authentication configuration and said new authentication configuration to authenticate incoming packets while said timer is counting down said first time;
sending outgoing packets using said old authentication configuration and authenticating incoming packets using both said old authentication configuration and said new authentication configuration while said timer is counting down said first time;
resetting said timer to said timer value when said timer expires said first time;
starting to count down said timer a second time;
sending outgoing packets using said new authentication configuration and authenticating incoming packets using both said old authentication configuration and said new authentication configuration while said timer is counting down said second time; and sending outgoing packets using said new authentication configuration and authenticating incoming packets using said new authentication configuration after said timer expires said second time.

30. A program storage device readable by a machine, tangibly embodying a program of instructions executable by the machine to perform a method for implementing a new authentication configuration or key in a network device having an old authentication configuration or key, the method comprising:

receiving a first timer value and a second timer value;

receiving the new authentication configuration or key;

setting a timer equal to said first timer value;

starting to count down said timer a first time;

after receiving said new authentication configuration or key, sending outgoing packets using said old authentication configuration or key and concurrently using both said old authentication configuration or key and said new authentication configuration or key to authenticate incoming packets while said timer is counting down said first time;

setting said timer to said second timer value when said timer expires said first time;

starting to count down said timer a second time;

sending outgoing packets using said new authentication configuration or key and authenticating incoming packets using both said old authentication configuration or key and said new authentication configuration or key while said timer is counting down said second time; and sending outgoing packets using said new authentication configuration or key and authenticating incoming packets using said new authentication configuration or key after said timer expires said second time.

31. A program storage device readable by a machine, tangibly embodying a program of instructions executable by the machine to perform a method for implementing a new authentication configuration in a network device having an old authentication configuration, the method comprising:

receiving a first timer value and a second timer value;

receiving the new authentication configuration;

setting a timer equal to said first timer value;

starting to count down said timer a first time;

after receiving said new authentication configuration, sending outgoing packets using said old authentication configuration and concurrently using both said old authentication configuration and said new authentication configuration to authenticate incoming packets while said timer is counting down said first time;

setting said timer to said second timer value when said timer expires said first time;

starting to count down said timer a second time;

sending outgoing packets using said new authentication configuration and authenticating incoming packets using both said old authentication configuration and said new authentication configuration while said timer is counting down said second time; and sending outgoing packets using said new authentication configuration and authenticating incoming packets using said new authentication configuration after said timer expires said second time.

* * * * *